W. M. AIKMAN.
COMPOSITE BAKE PAN.
APPLICATION FILED JULY 21, 1919.
1,343,991.
Patented June 22, 1920.
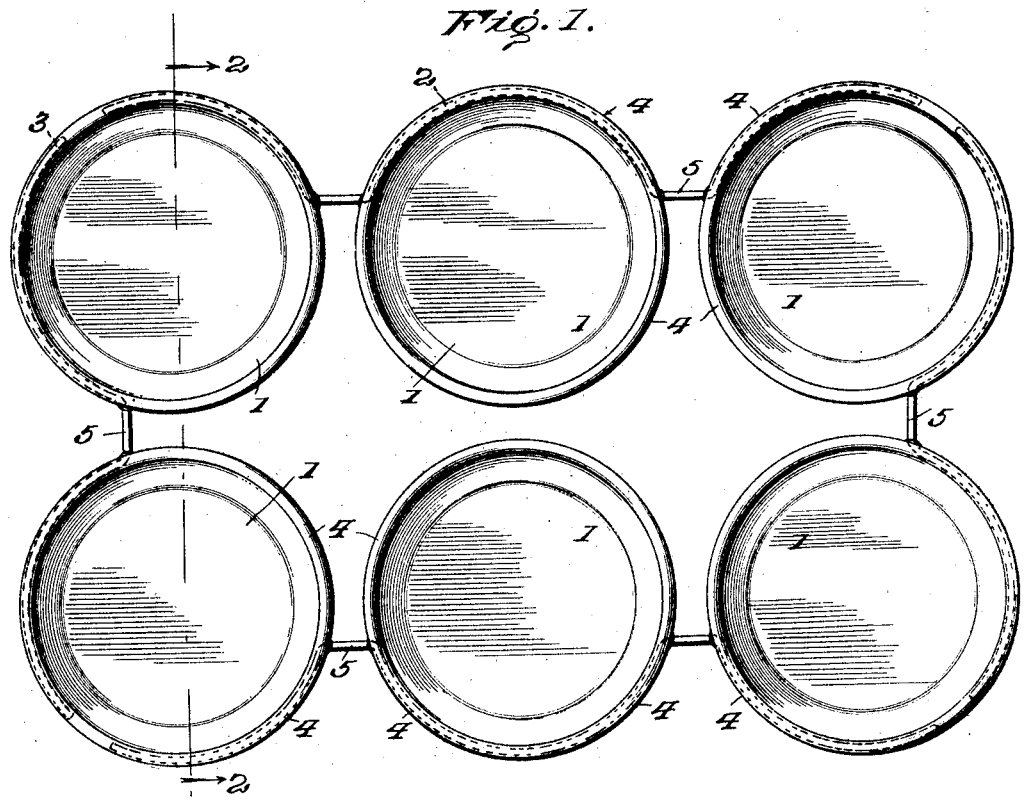
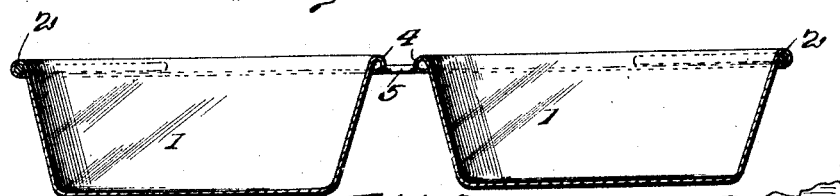
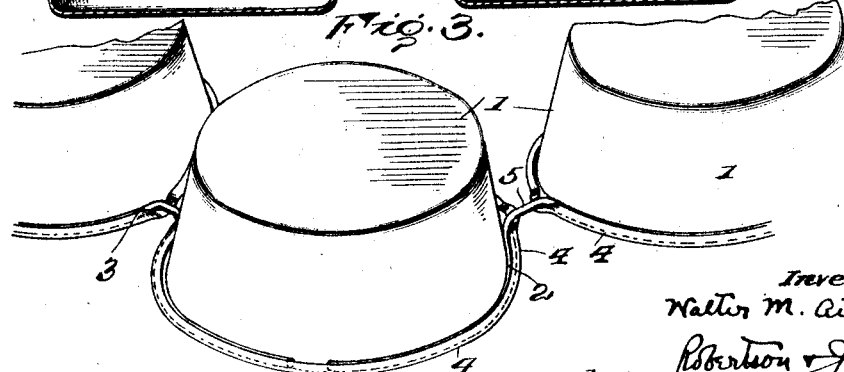

UNITED STATES PATENT OFFICE.

WALTER M. AIKMAN, OF GREENWICH, CONNECTICUT, ASSIGNOR TO THE CENTRAL STAMPING COMPANY, OF NEW YORK, N. Y., A CORPORATION OF NEW YORK.

COMPOSITE BAKE-PAN.

1,343,991.  Specification of Letters Patent.  Patented June 22, 1920.

Application filed July 21, 1919. Serial No. 312,445.

*To all whom it may concern:*

Be it known that I, WALTER M. AIKMAN, a citizen of the United States, and a resident of Greenwich, in the county of Fairfield and State of Connecticut, have invented certain new and useful Improvements in Composite Bake-Pans, of which the following is a specification.

My invention relates to composite bake pans of the kind in which a number of individual pans are secured together so that they can be handled as a unit. My object is to provide a composite pan of this character which combines in the highest degree simplicity, strength and utility. To this end I secure the individual pans together by wire which incloses a portion of each pan following the contour of its upper edge and by virtue of the fact that the said upper edge is beaded over it constituting a reinforced strengthening bead and, if desired, also holding the individual pans in spaced relation. In most previous structures of this general nature it has been thought necessary to employ a plurality of strengthening means, this being both expensive and undesirable and even in composite pans in which wire was employed to strengthen the upper edges of the individual pans, it did not give the same effect in holding the pans against displacement in all directions. The features of novelty are more particularly pointed out in the appended claims and will further appear in the detailed description of the drawings.

Referring to the drawings:

Figure 1 is a top plan view of a composite bake pan embodying my invention.

Fig. 2 is a vertical section on the line 2—2, Fig. 1, looking in the direction of the arrows, and Fig. 3 is an incomplete detailed perspective view looking at the under side of the composite pan and showing the details as to the arrangement of the wire and the beaded edges.

The individual pans 1 are what is known as muffin or biscuit pans and in the specific form illustrated are arranged in two rows of three pans each and are secured together by a plurality of wires, the side wires being indicated by the reference numeral 2 and the end wires by the numeral 3. This is a very convenient mode of construction but it will be understood that the use of a plurality of wires or of any given number of wires rather than a single piece of wire or a different number of wires is not necessary. The pans 1 have their upper edges beaded as indicated at 4. As shown in Fig. 3, this bead is carried all the way around both for appearance sake and for strength. It is beaded over the wire which thus becomes not only means for securing the pans firmly together but provides reinforced beads or strengthening edges for the individual pans. It will be noted that the wire incloses a portion of each pan, the result being that every pan is firmly held against displacement in any direction. By this it is not meant to assert absolute rigidity but that any objectionable displacement is prevented. In order that the heated air may pass up freely around the individual pans, it is preferable to space them apart and this is readily accomplished by providing the wire, which extends continuously along the contour of the upper edge of one pan to the adjacent pan and then along the contour of that pan, with an intermediate spacing portion 5.

The extreme simplicity and cheapness of my composite pan will immediately be obvious. Its efficiency should also be apparent since it exposes the individual pans completely to the heated air, permits the pans to be easily cleaned and to be hung up readily.

What I claim as my invention is:

1. A composite bake pan comprising a plurality of individual pans, clamping wire constituting the sole means of securing the pans together inclosing a portion of each pan said pans having their upper edges beaded over on said wire to constitute a reinforced strengthening bead and to hold each pan against displacement in any direction, said wire having reëntering spacing portions interposed between adjacent pans and extending between the beads of adjacent pans to hold the pans apart.

2. A composite bake pan comprising a plurality of rows of individual round bake pans constituting a group, and wire substantially inclosing the group having reëntering portions following portions of the curved contours of the upper edges of adjacent pans and joining the pans of the group together, said reëntering portions being adapted to prevent rotation of the pans about the wire, the upper edges of said pans being beaded over said wire to provide a reinforced strengthening edge and to secure the pans firmly together, thus insuring a substantially free flow of hot air upward around the individual pans.

3. A composite bake pan comprising a plurality of rows of individual round bake pans constituting a group, and wire substantially inclosing the group having reëntering portions following portions of the curved contours of the upper edges of adjacent pans, joining the pans of the group together, and constituting the sole means of connecting them, said reëntering portions being adapted to prevent rotation of the pans about the wire, the upper edges of said pans being beaded over said wire to provide a reinforced strengthening edge and to secure the pans firmly together, thus insuring a substantially free flow of hot air upward around the individual pans.

In testimony whereof I affix my signature in presence of two witnesses.

WALTER M. AIKMAN.

Witnesses:
GEORGE W. KETCHAM,
GUSTAV A. ROEPE.